United States Patent [19]

Hall

[11] 4,103,510
[45] Aug. 1, 1978

[54] PORTABLE COOLING CHEST OPERATIVELY ATTACHABLE TO AN AUTOMOBILE AIR CONDITIONING SYSTEM

[76] Inventor: Roger W. Hall, 27706 N. Pales, Mission Viejo, Calif. 92675

[21] Appl. No.: 749,839

[22] Filed: Dec. 13, 1976

[51] Int. Cl.² .................. F25D 19/00; B60H 3/04; F25D 23/12; F25D 11/04
[52] U.S. Cl. .................................. 62/299; 62/243; 62/337; 62/430; 62/438; 62/457; 62/511
[58] Field of Search .............. 62/438, 430, 457, 299, 62/243, 244, 337, 237, 511; 251/149.6; 137/614.04; 220/263, 13

[56] References Cited

U.S. PATENT DOCUMENTS

| | | | |
|---|---|---|---|
| 2,083,396 | 6/1937 | Philipp | 62/438 |
| 2,323,354 | 7/1943 | Rees | 62/438 |
| 2,690,653 | 10/1954 | Kleist | 62/430 |
| 2,718,763 | 9/1955 | Burgess et al. | 62/243 |
| 3,156,101 | 11/1964 | McGuffey | 62/430 |
| 3,166,912 | 1/1965 | Patrick | 62/337 |
| 3,280,586 | 10/1966 | Funakoshi | 62/457 |
| 3,605,431 | 9/1971 | Carson | 62/457 |
| 3,747,364 | 7/1973 | Laing | 62/430 |
| 3,850,006 | 11/1974 | Redfern et al. | 62/457 |

FOREIGN PATENT DOCUMENTS

| | | | |
|---|---|---|---|
| 785,370 | 5/1935 | France | 62/438 |
| 785,293 | 5/1935 | France | 62/438 |

*Primary Examiner*—Lloyd L. King
*Attorney, Agent, or Firm*—Cahill, Sutton & Thomas

[57] ABSTRACT

A portable cooling chest having a durable outer shell and an inner liner, each with bottom and side wall members, includes a unitary middle liner arranged in proximity to the bottom and side wall members of the outer shell to define an insulating compartment and in proximity to the bottom and side wall members of the inner liner to define a sealed cavity circumscribing the inner liner and containing eutectic fluid and immersed heat exchange coils. The heat exchange coils, coupled through a quick connect/disconnect means to the refrigerant of an automobile refrigeration system, circulate chilled refrigerant to chill and freeze the eutectic fluid within the sealed cavity and cool the interior space of the cooling chest.

9 Claims, 9 Drawing Figures

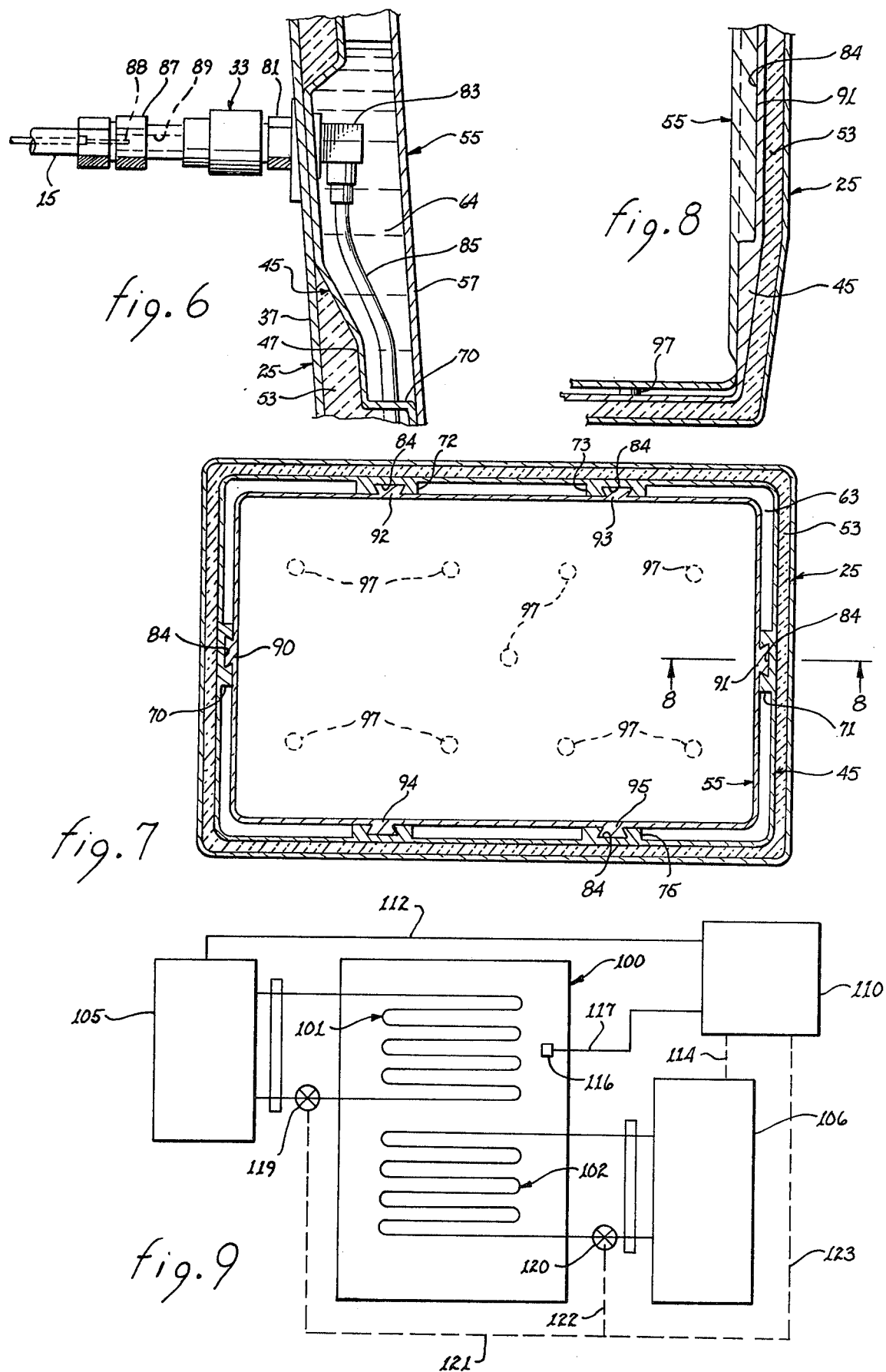

PORTABLE COOLING CHEST OPERATIVELY ATTACHABLE TO AN AUTOMOBILE AIR CONDITIONING SYSTEM

BACKGROUND OF THE INVENTION

1. Field of the Invention

The present invention relates to portable cooling chests and, more particularly, to portable cooling chests having cooling coils detachably attached in fluid communication with the refrigerant of an air conditioner to cool eutectic fluid disposed in a cavity within the side walls of the cooling chest.

2. Description of the Prior Art

With the advent of lightweight plastics and insulating materials, it has become well known to construct portable cooling chests from these lightweight and durable materials for purposes of maintaining the contents of the chests at low temperatures for a period of time, such as several hours. The most widely used cooling chests are merely insulated boxes capable of holding food and beverages and a heat absorption element such as ice or similar chilled material. To extend the operative period of cooling chests and avoid complete reliance upon the availability of ice or the like, various cooling chests having external heat absorption units have been developed. For example, U.S. Pat. No. 3,347,060 describes a cooler having a refrigeration unit and a power system incorporated as part of the portable cooler itself. U.S. Pat. No. 3,505,830 discloses a cooler connected to the evaporator housing of an air conditioning system within an automobile to channel cool air into the cooler. Other similar but non-portable coolers are known which are separably connected between the evaporator unit and the compressor-condenser unit of an air conditioning system, as disclosed in U.S. Pat. Nos. 2,630,688 and 2,540,649. Also, U.S. Pat. No. 3,041,852 discloses a non-portable external cooler permanently connected to a conventional home refrigerator. U.S. Pat. No. 3,850,006 describes a portable cooler having a cooling unit disposed centrally within the cooler and connectable to an automobile air conditioner. The cooler disclosed in U.S. Pat. No. 3,850,006 severely limits the storage capacity of the cooler because the cooling unit imposes upon and reduces the storage arrangement and volume of the chest.

SUMMARY OF THE INVENTION

It is therefore a primary object of the present invention to provide a portable cooling chest having cooling elements disposed within the side walls of the chest and connectable to a refrigeration unit.

Another object of the present invention is to provide a portable cooling chest detachably attachable to the refrigeration system of an automobile by quick disconnect couplings which minimize refrigerant loss.

Still another object of the present invention is to provide a portable cooling chest with side walls having a sealed cavity disposed therein for eutectic fluid and cooling coils and a surrounding compartment of insulation.

Yet another object of the present invention is to provide a portable cooling chest with cooling coils immersed in eutectic fluid disposed in the side walls, which coils are connectable to a separate refrigeration unit.

A further object of the present invention is to provide a portable cooling chest with a built in cooling unit which unit does not impinge upon the storage capacity of the cooling chest.

A yet further object of the present invention is to provide a portable cooling chest with integral cooling coils readily detachably attachable to the refrigeration unit of an automobile by unskilled persons.

A still further object of the present invention is to provide a portable cooling chest having an outer shell, a middle liner, insulation disposed within a compartment intermediate the outer shell and middle liner, an inner liner defining a circumscribing side wall located cavity intermediate the middle liner and the inner liner and cooling coils disposed in eutectic fluid within the cavity.

A still further object of the present invention is to provide a portable cooling unit having a pair of independently operating cooling coils disposed in a cavity containing eutectic fluid, one of which coils is operatively connectable to a first source of refrigerant and the other of which is connectable to a second source of refrigerant.

These and other objects of the present invention will become apparent to those skilled in the art as the description thereof proceeds.

DESCRIPTION OF THE DRAWINGS

The present invention may be described with greater specificity and clarity with reference to the following figures, in which:

FIG. 6 is a detail view of the coupling apparatus for introducing refrigerant into the cooling chest.

FIG. 7 is a cross sectional view of a variant of the present invention.

FIG. 8 is a partial cross sectional view taken along lines 8—8 as shown in FIG. 7.

FIG. 9 is a block diagram illustrating a two coil system which may be incorporated within the present invention.

DESCRIPTION OF THE PREFERRED EMBODIMENT

Figure 1:
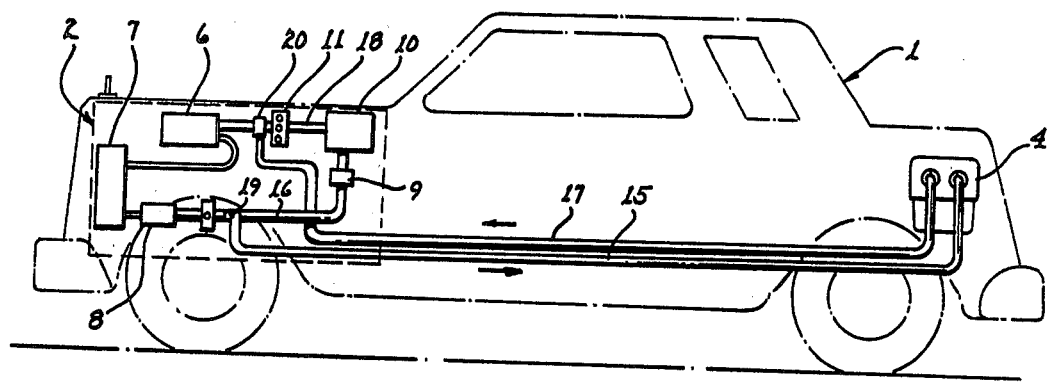
FIG. 1 illustrates a representative automobile having a refrigeration system and a portable cooling chest located in the trunk and operatively attached to the refrigeration system.

Referring to the drawings, FIG. 1 illustrates an automobile 1 equipped with an air conditioning or refrigeration system 2 and carrying a cooling chest 4 within the trunk. Refrigeration system 2 includes a compressor 6, a condenser 7, a receiver tank 8, an expansion valve 9, evaporator 10, low pressure regulating valve 11, and plumbing to interconnect these elements. Cooling chest 4 is operatively interconnected through line 15 with the refrigerant flowing within high pressure line 16 and through line 17 with the refrigerant flowing within low pressure return line 18 downstream of regulating valve 11. The tapping of high pressure line 16 and return line 18 may be effected by taps 19 and 20, such as saddle tapping valves manufactured by Sealed Unit Parts Company, Inc.; in the alternative, other temporary or permanent taps may be employed.

From the above description, it may be appreciated that refrigerant flowing from receiver tank 8 is channeled into both expansion valve 9 and line 15, the latter being the means by which refrigerant under pressure is conveyed to cooling chest 4. Similarly, refrigerant is returned from the cooling chest through line 17 to return line 18 and combines with the refrigerant flowing from evaporator 10 into regulating valve 11.

Figure 2:
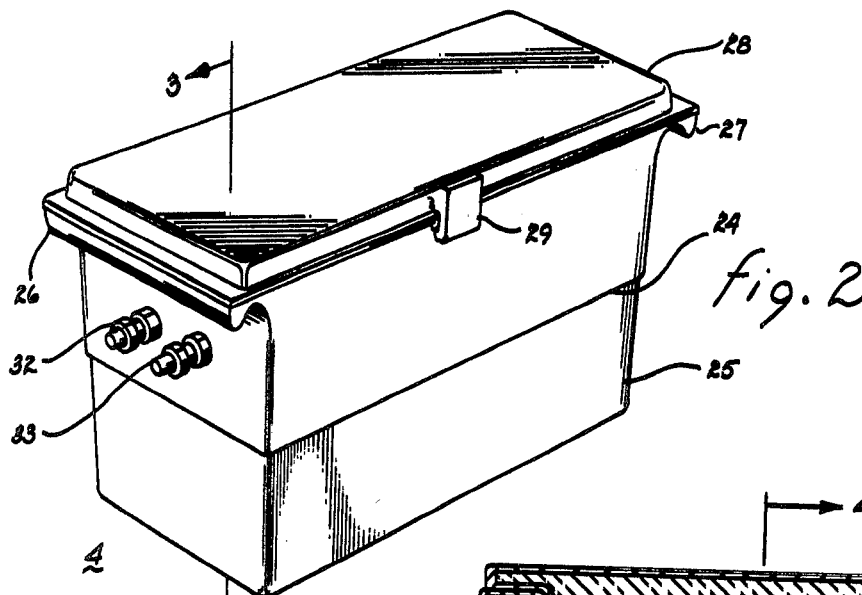
FIG. 2 is a perspective view of the cooling chest.

Turning now to FIG. 2, the external configuration of cooling chest 4 will be reviewed. The exterior surface of the chest may be developed from a durable shell 25 of plastic materials, such as ABS or polystyrene, configured with sloping sides and a step 24 to provide the requisite strength and yet accommodate manufacture by vacuum forming or injection molding techniques. Handles or grips 26 and 27 may be disposed along the upper part of the ends of the chest to facilitate transport of the chest. An insulated hinged lid or cover 28 extends across the opening of the chest and may include a latch 29 and hinges 34 (see FIG. 3) for securing the cover to the body of the chest. Quick connect/disconnect couplings 32 and 33 are disposed at one end of the chest; these couplings may be of the type identified as Series 1-HK manufactured by the Hansen Manufacturing Company and further described in U.S. Pat. No. 2,823,048.

In the following discussion of the structural details of cooling chest 4 which reflect the gist of the present invention, joint reference will be made to FIGS. 3, 4, 5, and 6. Shell 25 is readily formed as a single piece and includes bottom 36 and side walls 37, 38, 39, and 40, which side walls may be sloped as illustrated and include a peripheral laterally extending step 24 to enhance the structural rigidity of the shell. As discussed above, grips 26 and 27 may be formed integral with the upper part of side walls 37 and 38 or may be separate elements attached to the respective side walls.

A middle liner 45 nests within shell 25 and includes bottom 46, side walls 47, 48, 49, and 50, all of which are dimensioned to be internally displaced from the corresponding elements of shell 25. A flange 53 extends laterally outwardly from the top edges of side walls 47, 48, 49, and 50 and is sealingly attached to the corresponding upper edges of side walls 37, 38, 39, and 40 of shell 25. Thereby, an enclosed and sealed compartment of volume is developed intermediate the bottom and side walls of shell 25 and middle liner 45. This volume is filled, or nearly so, with insulation 54, such as low density polyurethane. This insulation may be of precut slabs fitted in place prior to attachment of the middle liner or the insulation may be inserted within the volume subsequent to attachment of the middle liner and cured to penetrate and conform with the configuration of the volume. In practice, it has been found expedient to pour a polyurethane liquid composition along with a catalyst into the volume and permit the resulting chemical reaction to generate a layer of foam permeating the volume intermediate the shell and middle liner.

An inner shell 55 nests within middle liner 45. Bottom 56 of the inner liner is adjacent to and supported by the bottom of the middle liner while side walls 57, 58, 59, and 60 are displaced laterally inwardly from the corresponding side walls of the middle liner. A flange 61 extends laterally outwardly in a circumscribing manner from the top of side walls 57, 58, 59, and 60. Flange 61 rests upon and is sealingly secured to the upper surface of flange 52 of middle liner 45, and the flange includes a circumscribing lip attached to the upper sides of shell 25. Thereby, a sealed cavity 63 is developed intermediate the side walls of the inner and middle liners.

Cavity 63 is partially filled through filler holes (not shown) with a eutectic fluid which is periodically frozen and maintained in a frozen state by a cooling coil, as will be described in more detail below.

To accommodate expansion of the eutectic fluid during freezing, a head space 65 may be maintained. Freezing of the eutectic fluid necessarily produces an accompanying expansion which expansion would cause inward bowing of the side walls of inner liner 55 unless such bowing were physically restrained. The bowing could be restrained by developing inner liner 55 from high strength nonresilient materials, but such materials are very expensive and would render the cooling chest unmarketable. Or, the inner liner could be fabricated as a thick walled element to constrain bowing of the side walls, but the thickness necessary to accomplish this purpose would severely reduce the rate of heat transfer through the inner liner with the result that the cooling effect of the frozen eutectic fluid would have a severely diminished cooling or chilling effect upon the contents stored within the cooling chest.

To promote heat transfer, the middle liner is preferably of thin material. To preclude a thin material liner from bowing and thereby diminish the storage capacity of the cooling chest, or even crush the contents within the cooling chest, the middle liner is developed with a plurality of ribs which extend across the cavity between the middle and inner liners and which ribs are secured to the middle liner by chemical welding, adhesives, or the like. As illustrated specifically in FIG. 5, ribs 70, 71, 72, 73, 74, and 75 extending inwardly from side walls 47, 48, 49, and 50, respectively, present planar surfaces in contacting relationship with the adjacent surface of the corresponding side walls of the inner liner. The height of these ribs above bottom 46 of the middle liner is not critical, but is preferably in general proximity to the level of the eutectic fluid within cavity 63. The ribs, as shown, are tapered upwardly, which taper is prompted to facilitate manufacture of the inner lining. It is to be understood that spacers, such as posts, may be developed intermediate the middle and inner liner or mechanical attachments may be employed to maintain the configuration of the inner liner and minimize inward bowing of the inner liner side walls.

To preclude upward bowing of bottom 56 of the inner liner due to hydrostatic pressure exerted by the eutectic fluid, the bottom of the inner liner may be chemically welded or otherwise secured to the adjacent bottom surface of the middle liner.

Indentation 30, extending peripherally about the lower inside edge of cover 28, is configured to mate with the intersection between the upper edges of the side walls defining the inner liner and flange 61 whereby a good seal is developed. To further ensure maintenance of the seal, the peripheral lip 31 of the cover has a flat bottom surface bearing against the flat upper surface of flange 61.

Figure 3:
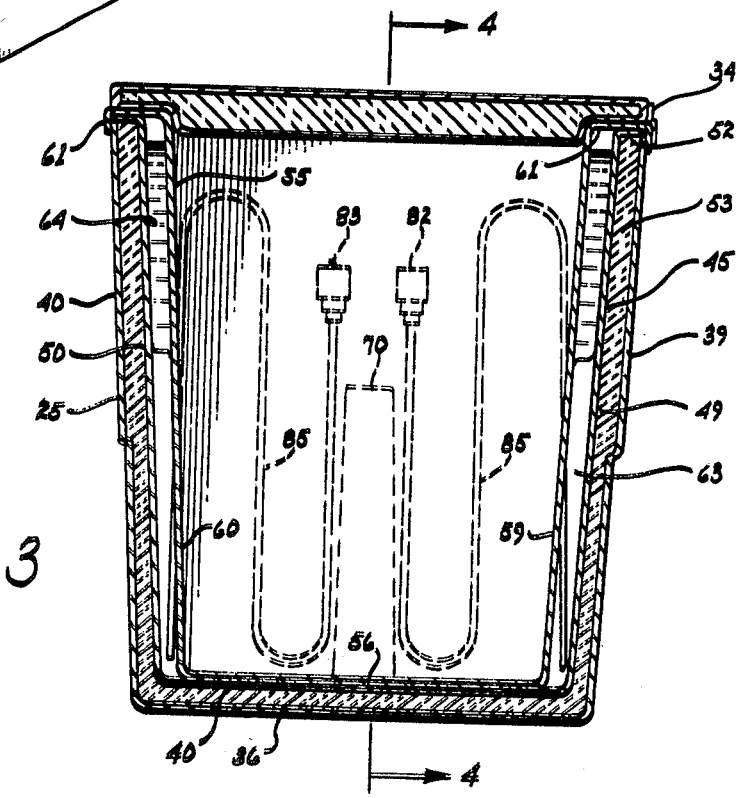
FIG. 3 is a cross sectional view taken alone lines 3—3, as shown in FIG. 2.
Figure 4:
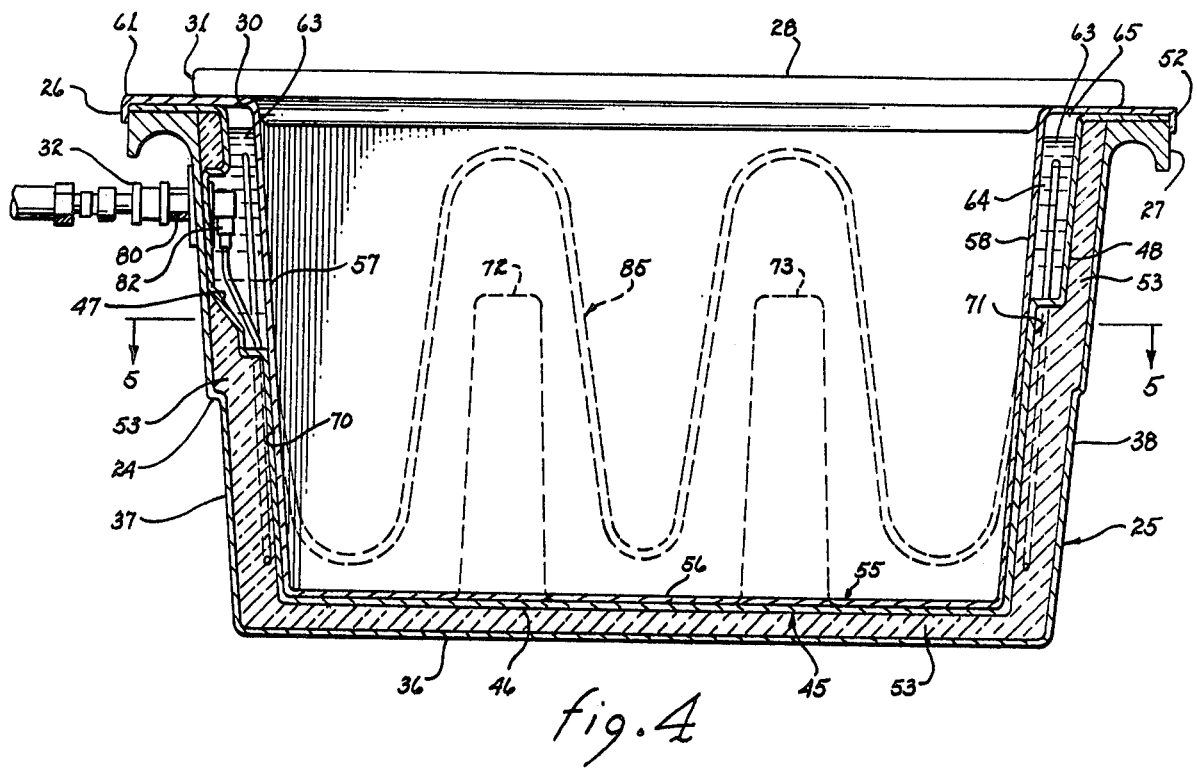
FIG. 4 is a cross sectional view taken along lines 4—4 as shown in FIG. 3.
Figure 5:
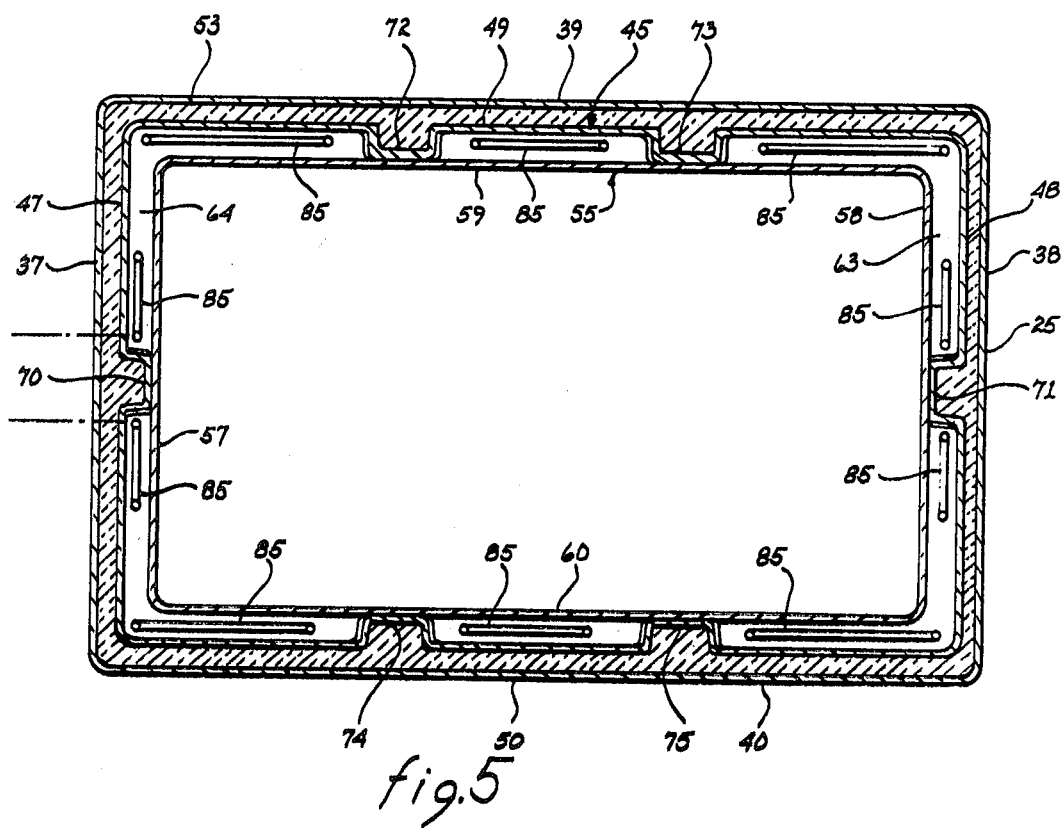
FIG. 5 is a cross sectional view taken along lines 5—5 as shown in FIG. 4.

Introduction of refrigerant into cooling chest 4 is effected through quick connect/disconnect couplings 32 and 33 as briefly discussed above. The male part of each of these couplings is attached to fittings 80 and 81 penetratably mounted through adjacent parts of shell 25 and middle liner 45. These fittings are terminated within cavity 63 by 90° fittings 82 and 83. A length of tubing, such as aluminum tubing of 5/16 inch diameter, is formed into a serpentine configuration and deposited within cavity 63 in a non-interfering relationship with ribs 70, 71 72, 73, 74, and 75, as illustrated in FIGS. 3, 4, and 5. The ends of tubing 85 are permanently attached to respective ones of fittings 82 and 83. In order to allow only a slight bend of the tubing extending from fittings 82 and 83, the part of middle liner 45 generally disposed beneath the fittings may be sloped inwardly at an angle as illustrated in FIGS. 4 and 6.

As is well known, expansion of a refrigerant under pressure brings about a rapid temperature drop of the refrigerant. The chilled refrigerant is thence conveyed through an area to be cooled to absorb heat from the area. Turning now to FIG. 6, the expansion valve employed in the present invention to effect a temperature drop of the refrigerant under high pressure and conveyed from refrigeration unit 2 of the automobile through line 15 will be described. A length of capillary tubing 86 extends from a fitting 87 at one end of coupling 33 into line 15; nominally, the capillary tubing extends about twelve inches into the line. End 88 of the capillary tubing is disposed within a volumetric space 89 within fitting 87 whereby the refrigerant flowing through line 15 is forced through capillary 86 and ejected into space 89. The sudden expansion of the refrigerant flowing out of end 88 results in a rapid temperature drop of the refrigerant, as is well known in the refrigeation art. The cooled refrigerant thence flows through coupling 32, fittings 81 and 83 into tubing 85. The cooled refrigerant within tubing 85 absorbs heat from the surrounding eutectic fluid and lowers its temperature to a predeterminable low point. The low pressure refrigerant flows out of tubing 85 through fittings 80 and 82, coupling 32, into line 17 and is conveyed to return line 18 through tap 20.

Where manufacturing requirements or other criteria preclude the use of chemical welding or adhsives to secure the inner liner to the middle liner, locking mechanisms of the type illustrated in FIGS. 7 and 8 might be employed. Each of ribs 70, 71, 72, 73, 74, and 75 are developed as solid elements having mortise 84 of a dovetail joint disposed therein in alignment with the longitudinal axis of the rib. Mating tenons 90, 91, 92, 93, 94, and 95 are formed on the exterior side walls of the inner liner in mating relationship with the corresponding mortises. To prevent or minimize bowing of the bottom of the inner liner due to hydrostatic forces developed by the eutectic fluid, snaps 97 or similar self-locking devices interconnect the bottom of the inner liner with the bottom of the middle liner. Thereby, the inner liner is mechanically secured to the middle liner which permits the use of relatively thin material for the inner liner to promote heat transfer therethrough and yet preclude more than minimal tolerable bowing of the side walls and bottom of the inner liner.

Although not illustrated for reasons of clarity, the tubing and eutectic fluid illustrated in FIGS. 3, 4, 5, and 6 is disposed within cavity 63 shown in FIG. 7.

Turning now to FIG. 9, there is illustrated in block form a cooler chest 100 having disposed therein two independent links of tubing serving as cooling coils 101 and 102. These coils may be in the form of serpentines as discussed above, which serpentines parallel one another within a eutectic fluid filled cavity of cooling chest 100. Cooling coil 101 is detachably connectable to a refrigeration unit 105, which may be of the automobile type illustrated in FIG. 1. Thereby, cooling chest 100 is transportable within an automobile or other vehicle while being connected to the refrigeration system of the vehicle and thereby capable of maintaining the contents within the chest chilled. Coil 102 is detachably connectable to a refrigeration unit 106 which may be of the type commonly used in dwellings powered by 110 volt alternating current or of the absorption type operating in response to the application of heat. Thereby, cooling chest 100 is readily usable on long trips by automobile where overnight stays are contemplated without incurring the possibility of the contents of the cooling chest becoming thawed or spoiled after shut-off of the automobile refrigeration system. That is, the cooling chest would be attached to refrigeration unit 106, which could be transported along with the chest and connectable to an external source of alternating current.

Regulation and control means 110 would regulate and control the operation of refrigeration units 105 and 106 through control lines 112 and 114 in response to the temperature sensed by sensor 116 with a signal reflective thereof conveyed to the regulation and control means through control line 117. Additionally, valves 119, 120 and feed-back circuitry 121, 122, 123 could be employed to preclude inadvertent operation of both refrigeration units or excessive continuing operation of a selected one of the refrigeration units after a predetermined temperature had been achieved. Coupling means 126, 127 accommodate disconnection from the refrigerant within refrigeration units 105 and 106, respectively, without appreciable loss of refrigerant.

For some applications, the system illustrated in FIG. 9 could be employed in conjunction with a chilling unit referred to as a hold-over plate rather than as the cooling chest identified by numeral 100. Were such a hold-over plate employed, it could be used to cool the presently used ice boxes within recreational vehicles and operated by the vehicle refrigeration system when underway and by a small refrigeration unit powered by an electrical generator or other external source of electrical power normally found in most recreational camps, or by a refrigeration unit operating upon the principle of absorption cooling could be employed to chill the hold-over plate.

In summary, the cooling chest described above chills or freezes a eutectic fluid disposed within the side walls of the chest, the location of which assures a generally uniform heat withdrawal from the contents of the chest and tends to preclude thermal isolation of some of the contents by the remaining contents, as is common in cooling chests having the cooling unit or element deposited within the chest storage compartment itself. The use of the type of quick connect/ disconnect couplings described above incurs a very minimal loss of refrigeration during coupling and uncoupling; moreover, other couplings are also available which essentially preclude loss of any refrigerant during coupling and uncoupling, but couplings of this type are relatively expensive. As the expansion valve, the capillary tube, is disposed within the high pressure line itself and not within the apparatus of the cooling chest, no keying or other identifying symbology is necessary in order to ensure mating of the appropriate ones of the couplings; instead, lines 15 and 16 are interchangeably connectable with fittings 80 and 81. The use of a middle liner of unitary construction and sealingly sandwiched between the shell and the inner liner ensure segregation of the insulating compartment from the eutectic fluid cavity and the possibility of seepage of the eutectic fluid into the insulation is essentially precluded. By securing selected areas of the inner liner to the middle liner, bowing of the side walls or bottom of the inner liner into the storage area due to hydrastatic forces is essentially precluded whereby the full storage capacity is maintained and crushing of stored contents is very unlikely.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A portable cooling chest detachably attachable to an external source of refrigerant under pressure for chilling the contents disposed within said cooling chest, said cooling chest comprising in combination:
   a. an outer shell;
   b. a middle liner having side walls and a bottom and nested within said shell, said middle liner defining a compartment intermediate said shell and said middle liner;
   c. insulation means disposed within the compartment for reducing the rate of heat transfer between said shell and said middle liner;
   d. an inner liner having side walls and a bottom and nested within said middle liner for defining the storage capacity of said cooling chest, said inner liner developing a cavity intermediate said inner liner and said middle liner;
   e. spacing and retaining means disposed within the cavity for restraining bulging and deformation of the side walls of said inner liner;
   f. eutectic fluid disposed within the cavity;
   g. a cooling coil disposed within the cavity for chilling said eutectic fluid; and
   h. coupling means for coupling said cooling coil in fluid communication with the source of refrigerant;

whereby, said chilled eutectic fluid absorbs heat from the contents of said cooling chest through the side walls of said inner liner and said insulation means reduces the transfer of heat from said shell to said eutectic fluid to maintain the contents chilled after detachment of said cooling coils from the source of refrigerant.

2. The cooling chest as set forth in claim 1 wherein the bottoms of said middle liner and inner liner are attached adjacent one another for minimizing flow of said eutectic fluid therebetwen and restraining bulging of the bottom of said inner liner due to hydrostatic pressure.

3. The cooling chest as set forth in claim 2 including insulation means disposed about the side walls and bottom of said middle liner for reducing the rate of heat transfer from without said middle liner to said eutectic solution.

4. The cooling chest as set forth in claim 3 wherein said insulation means includes a shell having side walls and a bottom within which said middle liner is nested and further includes insulation disposed intermediate said shell and said middle liner.

5. The cooling chest as set forth in claim 4 including:
   a. a high pressure line and a low pressure line interconnecting the source of refrigerant with said coupling means; and
   b. an expansion valve comprising a capillary tube disposed within said high pressure line for reducing the pressure of the refrigerant and effecting a commensurate drop in temperature of the refrigerant;

whereby, the operation of said cooling coil is unaffected by which one of said coupling means is connected to said high pressure line.

6. The cooling chest as set forth in claim 1 wherein said spacing and retaining means comprises a plurality of ribs extending upwardly from the bottom of and along the side walls of said middle liner and extending laterally toward the repsective ones of the side walls of said inner liner.

7. The cooling chest as set forth in claim 6 wherein each of said ribs includes a mortise aligned longitudinally with said rib and wherein the side walls of said inner liner include a tenon mating with respective ones of said mortises.

8. The cooling chest as set forth in claim 7 including snap means for securing the bottom of said inner liner with the bottom of said middle liner.

9. The cooling chest as set forth in claim 4 wherein the side walls of said middle liner include a laterally outwardly extending flange sealingly secured to the upper edge of said shell and wherein the side walls of said inner liner include a laterally outwardly extending flange sealingly secured to said middle liner flange and to the upper exterior side of said shell.

10. A portable cooling chest detachably attachable to a source of refrigerant under pressure for chilling the contents disposed within said cooling chest, said cooling chest comprising in combination:
    a. an inner liner having side walls and a bottom for receiving the contents to be chilled within said cooling chest;
    b. a middle liner having side walls and a bottom disposed about said inner liner for defining a cavity intermediate the side walls of said inner liner and said middle liner;
    c. eutectic fluid disposed within the cavity;
    d. at least one cooling coil disposed within the cavity for chilling said eutectic fluid;
    e. coupling means for coupling said cooling coil in fluid communication with the source of refrigerant under pressure;
    f. a high pressure line and a low pressure line interconnecting the source of refrigerant with said coupling means; and
    g. an expansion valve comprising a capillary tube disposed within said high pressure line for reducing the pressure of the refrigerant and effecting a commensurate drop in temperature of the refrigerant;

whereby, said cooling coil absorbs heat uniformly from about the contents disposed within said inner liner without impinging upon the storage capacity of said cooling chest.